Feb. 3, 1948.  C. S. SZEGHO  2,435,296
CATHODE RAY TUBE PROJECTOR
Original Filed May 13, 1942
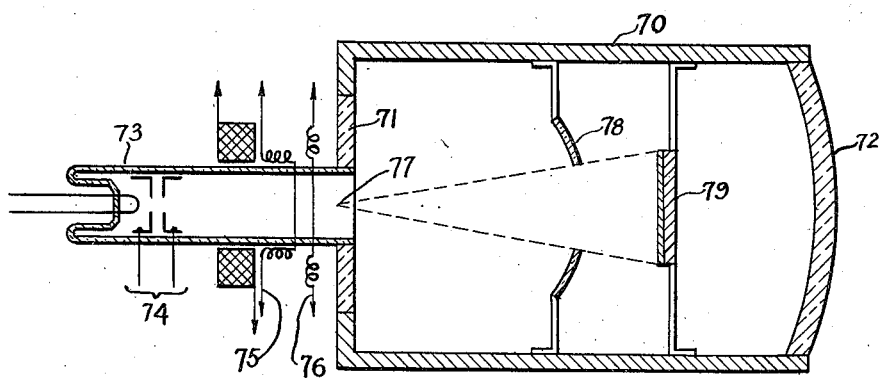
INVENTOR.
CONSTANTINE S. SZEGHO.
BY Paul Kolisch
ATTORNEY.

Patented Feb. 3, 1948

2,435,296

UNITED STATES PATENT OFFICE 2,435,296

CATHODE-RAY TUBE PROJECTOR

Constantin S. Szegho, Chicago, Ill., assignor to The Rauland Corporation, Chicago, Ill., a corporation of Illinois Application December 23, 1944, Serial No. 569,501, which is a division of application Serial No. 442,835, May 13, 1942. Divided and this application November 29, 1945, Serial No. 631,707

2 Claims. (Cl. 250—164)

This invention relates to new and useful improvements in cathode ray tube projectors of the kind employed in large screen television receivers. This is a division of my application Serial No. 569,501, filed December 23, 1944 issued as Patent No. 2,415,311 February 4, 1947, which in turn was a division of application Serial Number 442,835, filed May 13, 1942.

The object of the invention is to increase the light output of projectors using a mirror optic, such as the Schmidt camera. (James G. Baker: The solid-glass Schmidt camera and a family of flat-field cameras, equivalent in performance to the Schmidt camera. Proceedings of American Philosophical Society, vol. 82, No. 3, April 1940.)

In the Schmidt camera type of projector a cathode ray tube having fluorescent material deposited on a transparent support, usually a wall of the cathode ray tube, is located between a large diameter spherical mirror and a correcting plate. The light is first produced at the cathode or back side of the surface of the fluorescent powder and then passes through the powder to emerge from the front surface contacting with the transparent support, usually the end wall of the tube. The electrons impinge on the back side surface of the layer. The outside surface faces the spherical mirror. In such back surface projection much of the light is lost by absorption in the fluorescent layer.

In accordance with the present invention, the light output of the projector is increased by providing a front surface projection cathode ray tube between the mirror and the correcting plate of a Schmidt camera type of optical system.

The drawing illustrates an embodiment in which the tube, mirror and correcting plate are assembled as a unitary structure.

A flat field type of Schmidt camera is combined with a cathode ray tube. A cylinder 70 has one end closed by a correcting plate 71 and the other end by a concave mirror 72. A neck 73 containing the usual electron gun 74 and deflecting means 75, 76 is connected with the envelope through a central opening 77 in the correcting plate 71. Electrons shot out from gun 74 pass through an aperture in an auxiliary convex mirror 78 onto a flat flourescent surface 79 and the image formed on the fluorescent surface is reflected by the mirror 78 through to the mirror 72 and then through plate 71.

The auxiliary mirror 78 is metallized at the back and around the opening to prevent charging-up by stray electrons.

What I claim is:

1. In combination, a fluorescent surface, a support of conducting material therefor, an electron gun for exciting said surface, a first mirror for reflecting light emanating and emerging from said surface, a second mirror for reflecting light reflected by the first mirror, a correcting plate in the path of the light rays reflected by the second mirror, and an evacuated chamber enclosing said gun, surface and first mirror and the wall of which is partly made up of said second mirror and plate.

2. In combination, a fluorescent surface, a support of conducting material therefor, an electron gun for exciting said surface, a first mirror for reflecting light emanating and emerging from said surface and having a central aperture through which electrons shot out from said gun pass towards said surface, a second mirror for reflecting light reflected by the first mirror, a correcting plate in the path of the light rays reflected by the second mirror, an evacuated envelope enclosing said surface, support and first mirror, and having one wall made up of said second mirror and an opposite wall made up of said plate, and a neck for said envelope enclosing said gun and projecting through a central aperture in said plate.

CONSTANTIN S. SZEGHO.

REFERENCES CITED

The following references are of record in the file of this patent:

FOREIGN PATENTS

| Number | Country | Date |
| --- | --- | --- |
| 557,771 | Great Britain | Dec. 3, 1943 |